(12) United States Patent
Bojjanapalli et al.

(10) Patent No.: US 12,545,393 B2
(45) Date of Patent: Feb. 10, 2026

(54) SYSTEMS FOR PRECISE CONTROL OF WIPER

(71) Applicant: Rosemount Aerospace Inc., Burnsville, MN (US)

(72) Inventors: Muralidhar Rao Bojjanapalli, Hyderabad (IN); Alexander N. Reid, St. Louis Park, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 186 days.

(21) Appl. No.: 18/239,806

(22) Filed: Aug. 30, 2023

(65) Prior Publication Data
US 2024/0359790 A1    Oct. 31, 2024

(30) Foreign Application Priority Data

Apr. 25, 2023   (IN) .............................. 202341029889

(51) Int. Cl.
*B64C 1/14* (2006.01)
*B60S 1/08* (2006.01)

(52) U.S. Cl.
CPC . *B64C 1/14* (2013.01); *B60S 1/08* (2013.01)

(58) Field of Classification Search
CPC ..................................... B64C 1/14; B60S 1/08
USPC .......................................................... 701/49
See application file for complete search history.

(56) References Cited

U.S. PATENT DOCUMENTS

| | | | |
|---|---|---|---|
| 5,355,061 A | 10/1994 | Forhan | |
| 5,404,085 A | 4/1995 | Resch et al. | |
| 5,479,077 A | 12/1995 | Kline et al. | |
| 6,111,378 A * | 8/2000 | LeMay | H02K 11/38 318/443 |
| 6,249,098 B1 * | 6/2001 | Miyazaki | B60S 1/08 318/443 |
| 10,071,710 B2 * | 9/2018 | Takimoto | B60S 1/163 |
| 2008/0028563 A1 * | 2/2008 | Yoshigoe | B60S 1/0818 318/483 |
| 2010/0139025 A1 * | 6/2010 | Natsume | B60S 1/0896 15/250.31 |
| 2014/0013535 A1 * | 1/2014 | Natsume | B60S 1/08 15/250.12 |
| 2016/0318484 A1 | 11/2016 | Takimoto et al. | |

(Continued)

FOREIGN PATENT DOCUMENTS

JP          2009067261 A        4/2009

OTHER PUBLICATIONS

European Search Report received in EP Application No. 24171424.5, Oct. 8, 2024, 8 pages.

*Primary Examiner* — Manglesh M Patel
(74) *Attorney, Agent, or Firm* — Suiter Swantz IP

(57) ABSTRACT

A system includes a wiper arm configured to sweep along a sweep zone defined between a start position and an end sweep position, a wiper drive shaft operatively connected at a proximal end to the wiper arm to drive the wiper arm between the start position and the end sweep position, a tracer operatively connected to a distal end of the wiper drive shaft configured to mimic movement of the wiper arm, and one or more position indicators disposed proximate a distal end of the tracer corresponding to at least the start position and the end sweep position, where the distal end of the tracer configured interact with the one or more limiters during operation of the wiper arm.

20 Claims, 8 Drawing Sheets

(56) References Cited

U.S. PATENT DOCUMENTS

| | | | |
|---|---|---|---|
| 2017/0158172 A1* | 6/2017 | Ikeda | B60S 1/28 |
| 2017/0313282 A1* | 11/2017 | Amagasa | B60S 1/0814 |
| 2018/0086310 A1* | 3/2018 | Gage | B60S 1/0866 |
| 2018/0244245 A1* | 8/2018 | Schmidt | B60S 1/0888 |
| 2019/0016307 A1* | 1/2019 | Negi | G06V 20/56 |
| 2019/0263359 A1* | 8/2019 | Ijima | B60S 1/08 |
| 2021/0016746 A1* | 1/2021 | Bojjanapalli | B60S 1/0807 |
| 2021/0155203 A1* | 5/2021 | Kracker | B60S 1/0469 |
| 2021/0323505 A1* | 10/2021 | Bojjanapalli | B60S 1/26 |
| 2022/0234542 A1 | 7/2022 | Srinivas et al. | |
| 2022/0402460 A1* | 12/2022 | Park | B60S 1/0818 |
| 2024/0109519 A1* | 4/2024 | Duff | B60S 1/3411 |
| 2024/0140364 A1* | 5/2024 | Schaeuble | B60S 1/0844 |

\* cited by examiner

SYSTEMS FOR PRECISE CONTROL OF WIPER

CROSS REFERENCE TO RELATED APPLICATIONS

This application claims priority to Indian Provisional Patent Application No. 202341029889 filed Apr. 25, 2023, the entire content of which is herein incorporated by reference.

TECHNICAL FIELD

The present disclosure relates to wiper control and more particularly to systems for precise wiper control and systems for preventing over sweep.

BACKGROUND

Wiper arms are driven by wiper motor through a gear reducer, multiple revolutions of a motor shaft are required to produce the required sweep arc of the wiper arm on the windshield. Typically, a number of motor shaft rotations in the clockwise and counter clockwise directions are defined by software code with respect to predefined reference positions to meet the sweep arc. Control logic can be coded to define the number of motor rotations in each direction to cover the angle per specification. However, such control schemes may suffer from accuracy in controlling the position of the wiper, for example, the coded logic may suffer from under sweep or over sweep given changing environmental conditions, or due to a failure of soft controls. In addition under or over sweep, unexpected failure of the soft controls may cause the wiper arm to behave erratically.

The conventional techniques have been considered satisfactory for their intended purpose. However, there is an ever present need for improved systems and methods for more precise control of the wiper arm, for example, protecting the wiper arm from drastically deviated from a prescribed wiping zone. This disclosure provides a solution for this need.

SUMMARY

In accordance with at least one aspect of this disclosure, a system includes a wiper arm configured to sweep along a sweep zone defined between a start position and an end sweep position, a wiper drive shaft operatively connected at a proximal end to the wiper arm to drive the wiper arm between the start position and the end sweep position, a tracer operatively connected to a distal end of the wiper drive shaft configured to mimic movement of the wiper arm, and one or more position indicators disposed proximate a distal end of the tracer corresponding to at least the start position and the end sweep position, where the distal end of the tracer configured interact with the one or more limiters during operation of the wiper arm. A controller can be operatively connected to the one or more position indicators to receive wiper arm position data therefrom. The controller can be configured control movement of the wiper arm to prevent the wiper arm from sweeping beyond the start position and the end sweep position during operation of the wiper arm based at least in part on the wiper arm position data.

In embodiments, the one or more position indicators can be or include one or more sensors of a sensor array. In certain embodiments, the distal end of the tracer can include sensor transmitter configured to transmit a sensor signal from the tracer to the sensor array. The one or more sensors can include a first sensor and a second sensor. Each of the first and second sensors can include respective sensor receivers configured to receive the sensor signal from the tracer to determine a position of the tracer along the sensor array.

In embodiments, the first sensor and the second sensor can be physically positioned on the sensor array to indicate desired positions, e.g., the first sensor corresponding to the start position and the second sensor corresponding to the end sweep position.

In embodiments, the sensor array can also include a third sensor corresponding to a park position. The third sensor can include sensor receiver configured to receive the signal from the tracer to determine when the wiper arm is in the park position.

In embodiments, the system can further include a motor (e.g., a bi-directional motor) having a motor drive shaft operatively connected to the wiper drive shaft to oscillate the wiper arm via the wiper drive shaft. In certain embodiments, the motor shaft can be connected to the wiper drive shaft via a gear reducer. With the tracer proximate the first sensor or the second sensor such that the first sensor or the second sensor receives a respective sensor signal from the sensor transmitter on the tracer, the controller can be configured to stop and/or reverse movement of the wiper arm irrespective of whether a predetermined number of motor shaft revolutions have occurred.

In accordance with at least one aspect of this disclosure, a system can include a wiper arm configured to sweep along a sweep zone defined between a start position and an end sweep position, a wiper drive shaft operatively connected at a proximal end to the wiper arm to drive the wiper arm between the start position and the end sweep position, a tracer operatively connected to a distal end of the wiper drive shaft configured to mimic movement of the wiper arm, and one or more position limiters disposed proximate a distal end of the tracer corresponding to at least the start position and the end sweep position, where the distal end of the tracer configured interact with the one or more limiters during operation of the wiper arm. A controller can be operatively connected to the one or more position indicators to receive wiper arm position data therefrom. The controller can be configured control movement of the wiper arm to prevent the wiper arm from sweeping beyond the start position and the end sweep position during operation of the wiper arm based at least in part on the wiper arm position data In certain embodiments, the one or more position limiters can include a first limit switch and a second limit switch corresponding to position limits just beyond the start position and the end sweep position. In certain such embodiments, with the tracer activating the first limit switch or the second limit switch, the controller can be configured to stop movement of the wiper arm and shut down the motor irrespective of whether a predetermined number of motor shaft revolutions have occurred. In embodiments, the position limiters can be enabled with adjustment means in an arc for changing the limit switch position based on an application for example.

In certain embodiments, the one or more position limiters can include the two limit switches and the limit switches can be physically just beyond an inner and an outer limit of the sweep zone.

In embodiments, the system can include a vehicle having a windshield, the wiper arm mounted to the vehicle configured to wipe the windshield. An area between the start position and the end sweep position can define a sweep zone. The sweep zone can be defined on the windshield based on a desired user viewing portion. In certain embodiments, the vehicle can be an aircraft and the windshield can be a cockpit windshield.

In embodiments, an area between the start position and the end sweep position can define a sweep zone, and the sweep zone can be defined on the windshield based on a desired user viewing portion, where the controller can be configured to confine movement of the wiper arm within the sweep zone.

In accordance with at least one aspect of this disclosure, a non-transitory computer readable medium can include computer executable instructions stored therein, the computer executable instructions configured to cause a computer to perform a method. In embodiments, the method can include controlling movement of a wiper arm based at least in part on a position of a tracer operatively connected the wiper arm relative to one or more position indicators such that total displacement of the wiper arm is confined to a predetermined sweep zone defined by the one or more position limiters.

In embodiments, controlling movement of the wiper arm can include stopping movement of the wiper arm and/or reversing movement of the wiper arm when the tracer interacts with the one or more position indicators irrespective of whether a predetermined number of wiper shaft revolutions have occurred.

In certain embodiments, the one or more position indicators can include a first sensor and a second sensor defining the sweep zone, the first and second sensors including sensor receivers configured to receive a sensor signal from a sensor transmitter on the tracer to determine a position of the tracer along the sensor array. In certain such embodiments, controlling movement of the wiper arm can include reversing movement of the wiper arm when the tracer is proximate the first sensor or the second sensor such that the first sensor or the second sensor receives a respective sensor signal from the sensor transmitter on the tracer irrespective of whether a predetermined number of wiper shaft revolutions have occurred.

In certain embodiments, the one or more position indicators can include a first limit switch and a second limit switch positioned just beyond an inner and an outer limit of the sweep zone. In certain such embodiments, controlling movement of the wiper arm can include stopping movement of the wiper arm and/or shutting down a wiper system when the tracer activates the first limit switch or the second limit switch, irrespective of whether a predetermined number of wiper shaft revolutions have occurred.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
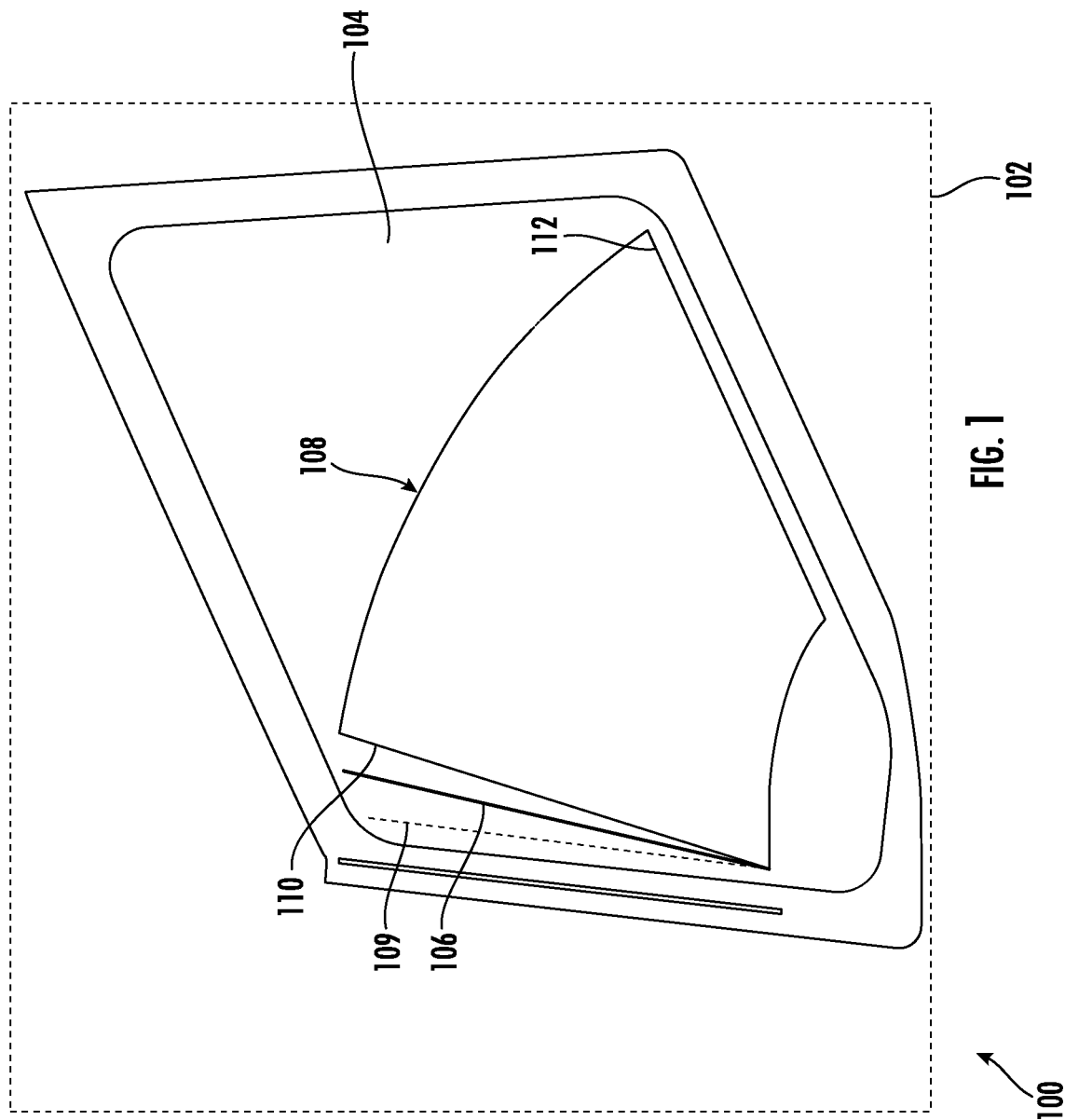
FIG. 1 is a schematic view of a system in accordance with this disclosure, showing a windshield having a wiper system thereon.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-9.

Certain windshield wiper technology does not provide for a means to take actual positional feedback of the wiper arm on the windshield. Instead, conventional systems include hardcoded software which instruct a motor to drive a certain number of revolutions in one direction, to move the wiper arm from a starting position to an ending position, before reversing the motor for the same number of revolutions in the opposite direction to move the wiper arm back from the ending position to the starting position to complete a sweep. Further, in the event the wiper arm over sweeps the windshield, systems for controlling the system (e.g., to shut down) are needed. In accordance with at least one aspect of this disclosure, a system 100 is described to address this.

Referring to FIG. 1, the system 100 can include a vehicle 102 having a windshield 104 and a at least one wiper arm 106 mounted to the vehicle 102 configured to wipe the windshield 104 along a sweep zone 108 defined between a start position 110 and an end sweep position 112. In certain embodiments, the vehicle 102 can include an aircraft having a cockpit windshield, and the desired user viewing portion 114 can be a viewing portion based on a pilot view for a given aircraft or as required by regulation for a given aircraft.

Figure 4:
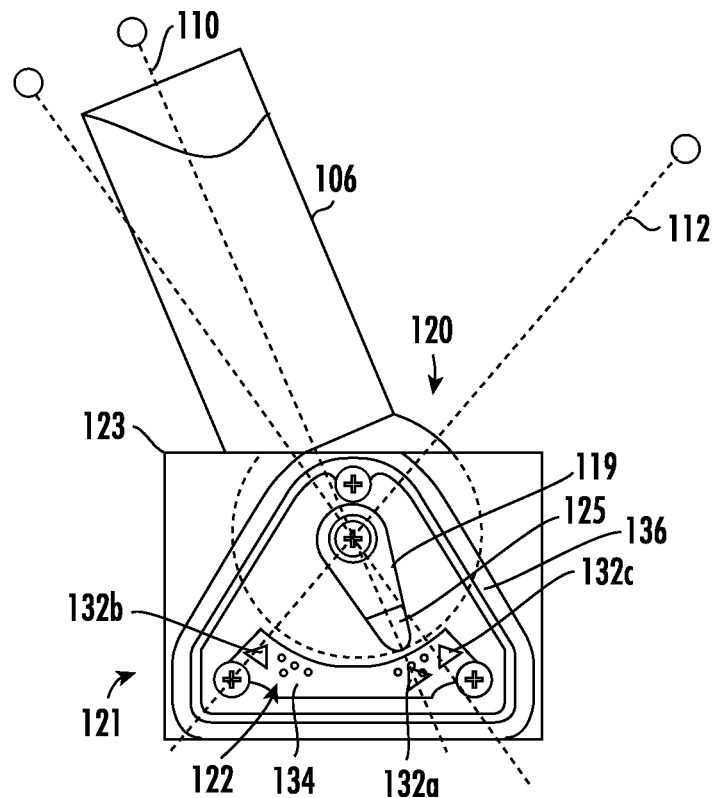
FIG. 4 is a schematic partial view of a rear housing, showing an embodiment of a position indicators (e.g., a sensor array)

With reference now to FIGS. 1-4, a wiper drive shaft 116 can be operatively connected to the wiper arm 106 at a proximal end 118 of the wiper drive shaft 116 to drive the wiper arm 106 between the start position 110 and the end sweep position 112. A tracer 119 can be operatively connected to a distal end 120 of the wiper arm drive shaft 116 to mirror or mimic movement of the wiper arm 106 and to mimic the position of the wiper arm 106 on the windshield 102 and can form a portion of a position indicator system 121. The position indicator system 121 can include one or more position indicators 122 included in a rear housing 123 disposed proximate a distal end 125 of the tracer 119. In embodiments, as shown in FIG. 4, the distal end 125 of the tracer 119 can point in a common direction with the distal end 120 of the wiper arm 119. The one or more position indicators 122 can be placed corresponding to at least the start position 110 and the end sweep position 112, where the distal end 125 of the tracer 119 is configured to interact with the one or more indicators 122 during operation of the wiper arm 106.

A motor 124 having a motor drive shaft 126 can be operatively connected to the wiper drive shaft 116 to drive the wiper arm 106 (e.g., oscillate) via the wiper drive shaft 116. In embodiments the motor 124 can be a bidirectional electric motor. The motor drive shaft 126 can be operatively connected to the wiper drive shaft 116 via a gear reducer 128 so that a predetermined number of revolutions of the motor drive shaft 126 moves the wiper arm 106 between the start position 110 and the end sweep position 112.

A controller 130 can be operatively connected to the one or more position indicators 122 to receive wiper arm position data therefrom. The controller 128 can be configured control movement of the wiper arm 106 to prevent the wiper arm 106 from sweeping beyond the start position 110 and the end sweep position 112 during operation of the wiper arm 106 based at least in part on the wiper arm position data. For example, the controller 130 can keep the wiper arm within the minimum or nominal sweep limits as defined in FIG. 1. Ideally, the predetermined number of motor drive shaft revolutions will keep the wiper arm 106 within these defined limits, however, this may not always be the case due to changing environmental conditions (e.g., aerodynamic loading or high-friction dry glass conditions), for example, which can affect gear reducer backlash and/or affect the relationship between motor revolutions and arm position. Thus, the controller 130 can use the position data provided by the position indicators 122 to keep the wiper arm 106 within the prescribed sweep limits, regardless of the whether the predetermined motor drive shaft revolutions are met, as described below.

Figure 5:
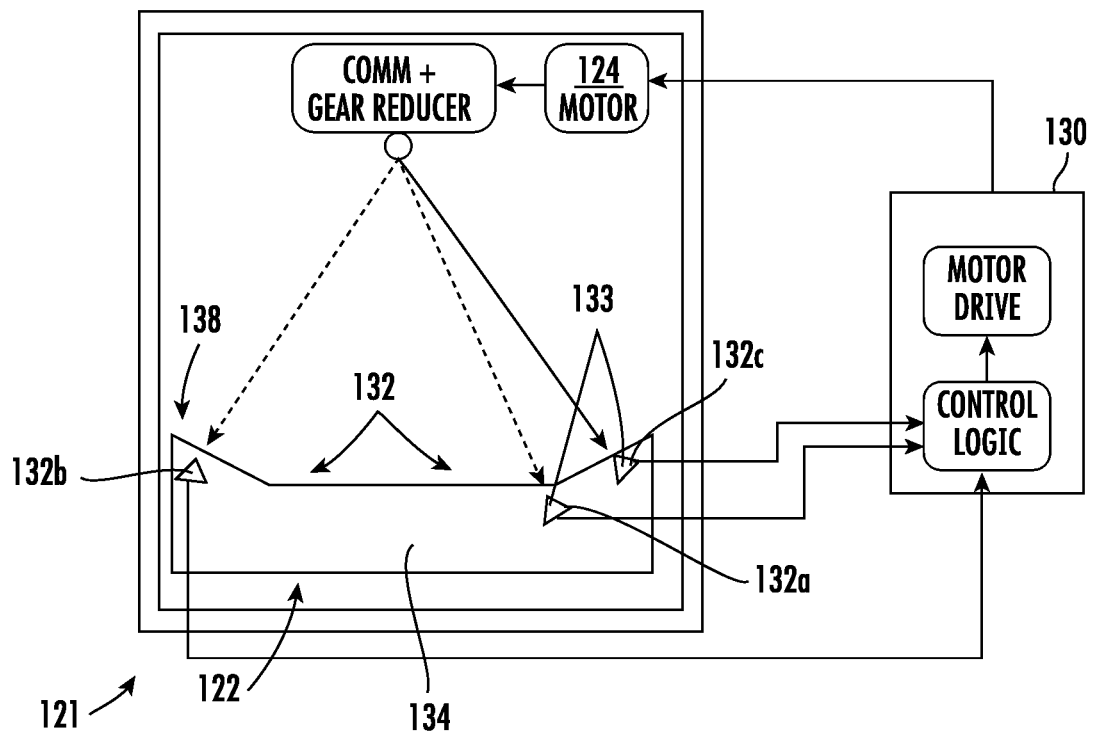
FIG. 5 is a schematic control logic diagram for the system of FIG. 4.
Figure 6:
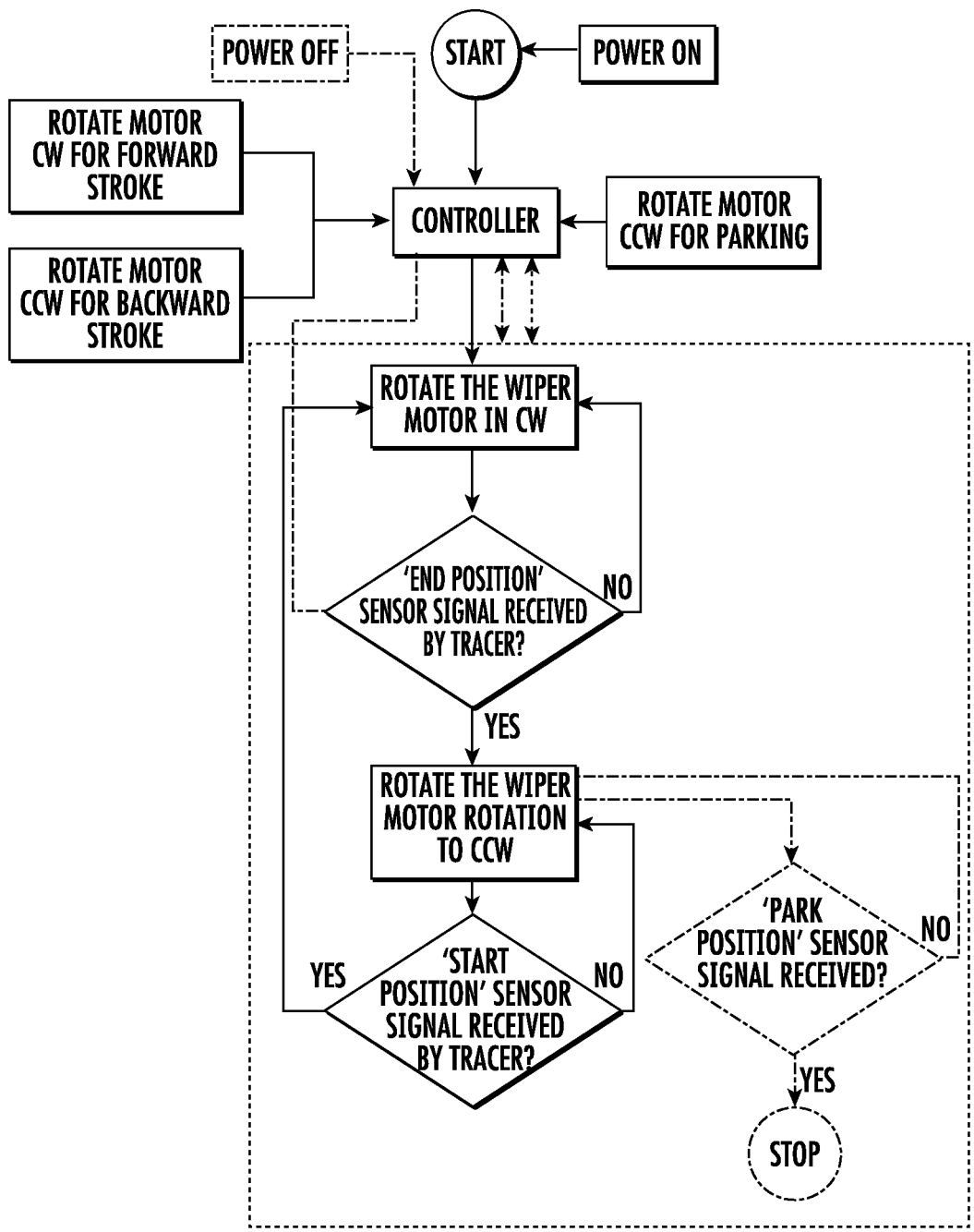
FIG. 6 is another schematic control logic diagram for the system of FIG. 4.

In certain embodiments, as shown in FIGS. 4-6, the one or more position indicators 122 can include one or more sensors 132 of a sensor array 134. The sensor array 134 is positioned adjacent to the tracer 119 to sense the position of the wiper arm 106 via the tracer 119 while the tracer 119 sweeps along the sensor array 134. The distal end 125 of the tracer 119 can include a sensor transmitter 136 configured to transmit a sensor signal from the tracer 119 to the sensor array 134. The one or more sensors 132 can include a first sensor 132a, a second sensor 132b, and a third sensor 132c. Each of the first, second, and third sensors 132a,b,c can include respective sensor receivers 138 configured to receive the sensor signal(s) from the tracer 119 to determine the position of the tracer 119 along the sensor array 134 with respect to the start position 110, the end position 112, and the park position 109.

The respective sensor receivers 132 can be physically positioned on the sensor array 134 to indicate desired sweep positions e.g., the first sensor receiver 132a corresponding to the start position 110, the second sensor receiver 132b corresponding to the end sweep position 112, and the third sensor receiver 132c corresponding to the park position 109.

With the tracer 119 proximate the first sensor 132a or the second sensor 132b such that the first sensor receiver 132a or the second sensor receiver 132c receives a respective sensor signal from the sensor transmitter on the tracer 119, the controller 128 can be configured to reverse movement of the wiper arm 106 irrespective of whether a predetermined number of motor shaft revolutions have occurred. Accordingly, the sensors 132 can impose an effective sweep limit on the wiper arm 106 to keep the wiper arm 106 within the predetermined sweep zone based on the physical location of the sensors 132 on the sensor array 134. In certain embodiments, the sensors can include active transmitters/receivers (e.g., IR sensors) or passive transmitter/receivers (e.g., Hall sensors), or any other suitable sensor receiver/transmitter pair, where the transmitter is located on the tracer 119. The control logic of the controller 130 is shown in FIGS. 5 and 6.

Figure 7:
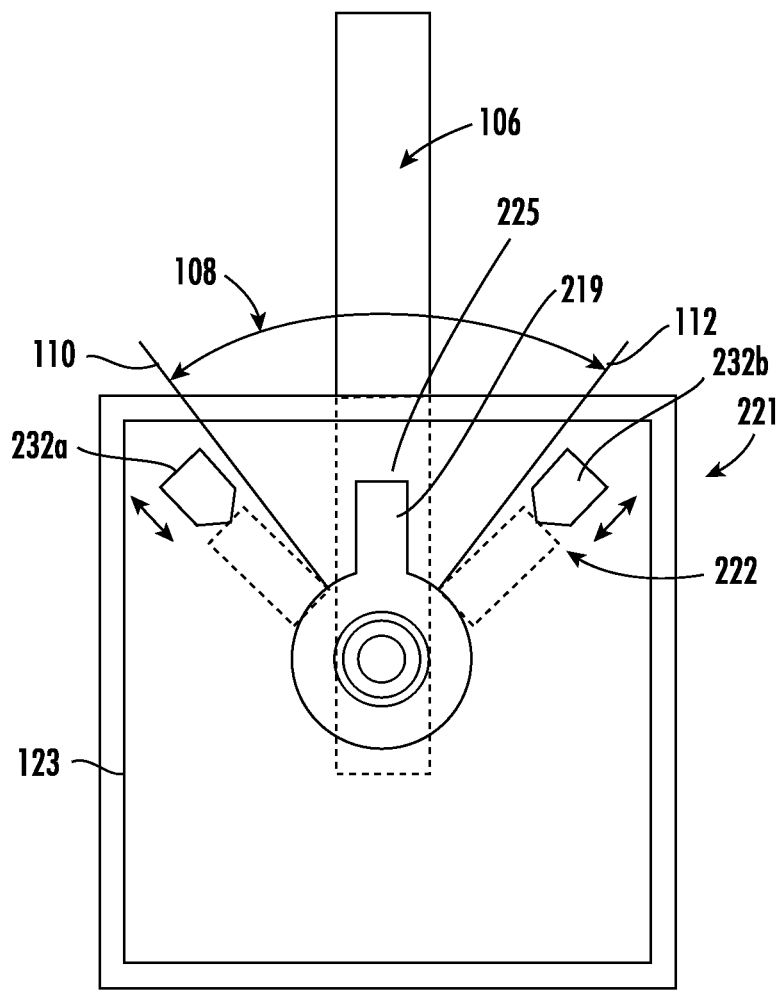
FIG. 7 is a schematic partial view of a rear housing, showing another embodiment of a position indicator (e.g., one or more position limiters)
Figure 8:
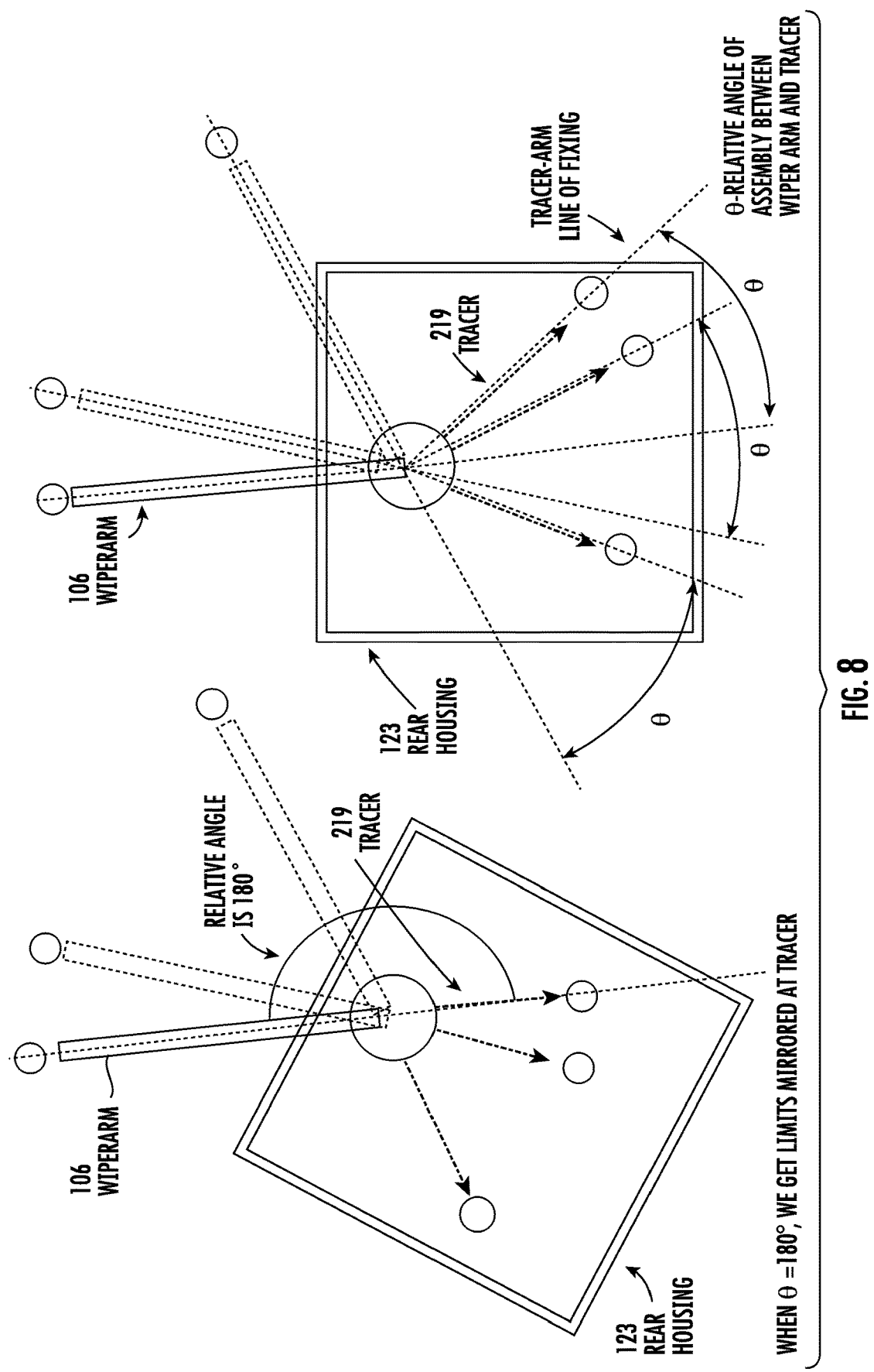
FIG. 8 is a schematic partial view of the rear housing of FIG. 7, showing relative orientation of a tracer to a wiper arm.
Figure 9:
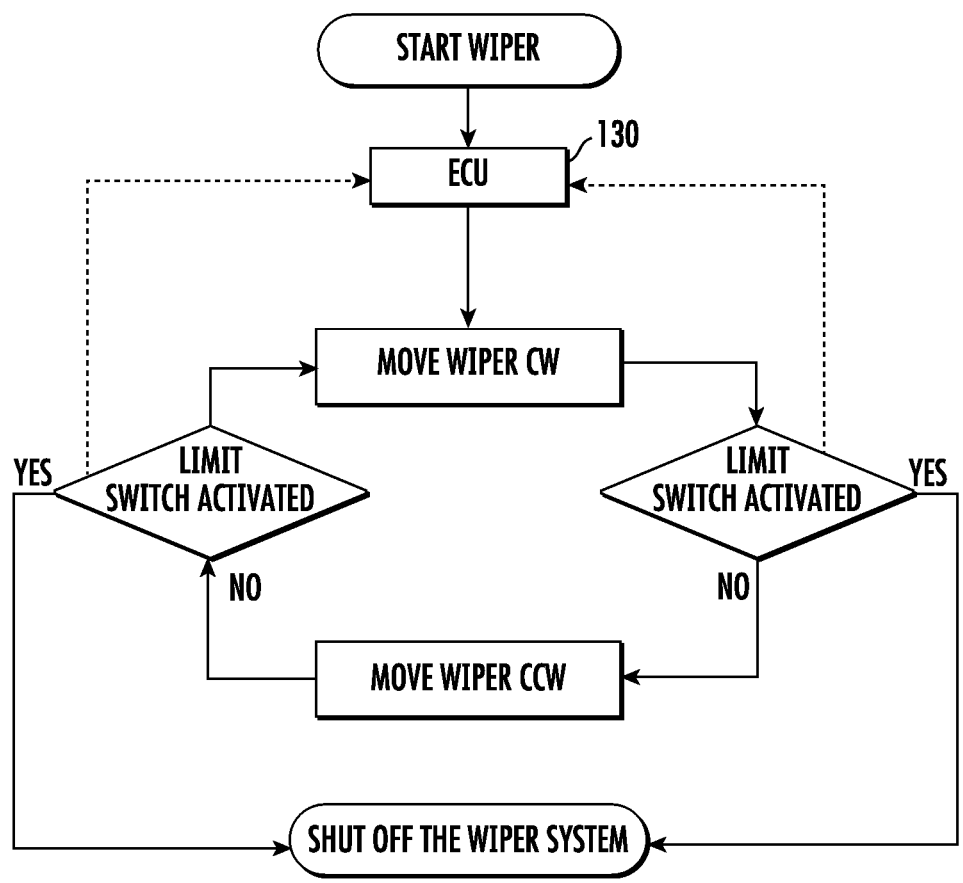
FIG. 9 is a schematic control logic diagram for the system of FIG. 7.

Referring now to FIGS. 7-9, in certain embodiments, the one or more position indicators 222 can include, in the position indicator system 221, a first limit switch 232a and a second limit switch 232b corresponding to hard stop positions. In certain embodiments, these hard stop positions can correspond to positions just beyond the start position 110 and the end sweep position 112 (e.g., as shown in FIG. 6). The hard stop positions can be absolute limits such that when they are reached, e.g., with the tracer 219 activating (e.g., interacting with) the first limit switch 232a or the second limit switch 232b, the controller 130 can be configured to stop movement of the wiper arm 106 and shut down the motor 124 altogether irrespective of whether a predetermined number of motor shaft revolutions have occurred. In embodiments, the position indicator system 221 need not check or otherwise monitor the number of revolutions of the shaft 116, instead the controller can be configured to shut down the motor 124 once either of the limit switches 232a. 232b are activated. The output from the limit switches 232a, 232b to the controller can be binary, such that when the either of the limit switches 232a. 232b are activated, the controller 130 shuts down the motor 124. position In embodiments, such as shown in FIG. 6, the tracer 219 can be aligned with the wiper arm 106 such that the distal end 225 of the tracer 219 points in an opposite direction of distal end 120 of the wiper arm 106, where the tracer 219 moves with the wiper arm 106.

In certain embodiments, as shown in FIG. 8 for example, the tracer 219 can be offset from the wiper arm by an angle θ chosen for a given application. For example, FIG. 8 shows on the left hand side, an embodiment where the relative angle θ is 180° for all positions of the wiper arm 106 and wiper arm 219. FIG. 8 on the right hand side shows an embodiment of relative angle θ, where θ is less than 180°. Because the angle θ is fixed and the tracer 219 tracks the movement of the wiper arm 106, each of the angles θ will be the same as the wiper arm 106 moves through its cycle.

In accordance with at least one aspect of this disclosure, for example as shown in FIGS. 5, 6, and 9, a non-transitory computer readable medium can include computer executable instructions stored therein, the computer executable instructions configured to cause a computer to perform a method. In embodiments, the method can include controlling movement of a wiper arm (e.g., wiper arm 106) based at least in part on a position of a tracer (e.g., tracer 119, 219) operatively connected the wiper arm relative to one or more position indicators (e.g., 122, 222) such that total displacement of the wiper arm is confined to a predetermined sweep zone defined by the one or more position indicators.

In embodiments, controlling movement of the wiper arm can include stopping movement of the wiper arm and/or reversing movement of the wiper arm when the tracer interacts with the one or more position indicators irrespective of whether a predetermined number of wiper shaft revolutions have occurred.

In certain embodiments, the one or more position indicators can include a first sensor and a second sensor defining the sweep zone, the first and second sensors including respective receivers configured to receive a sensor signal from a sensor transmitter on the tracer to determine a position of the tracer along the sensor array. In certain such embodiments, controlling movement of the wiper arm can include reversing movement of the wiper arm when the tracer when the tracer is proximate the first sensor or the second sensor such that the first sensor or the second sensor receivers receives a respective sensor signal from the sensor transmitter on the tracer irrespective of whether a predetermined number of wiper shaft revolutions have occurred.

In certain embodiments, the one or more position indicators can include a first limit switch and a second limit switch (e.g., limit switches 232a, 232b) positioned just beyond the to the start position 110 and end sweep position 112 of the sweep zone, or just beyond an inner and outer limit of the sweep zone, for example, where in embodiments, the start position 110 can define the inner limit and end sweep position 112 can define the outer limit. In certain such embodiments, controlling movement of the wiper arm can include stopping movement of the wiper arm and/or shutting down a wiper system when the tracer activates the first limit switch or the second limit switch.

Conventional windshield wiper systems use a predetermined number of motor shaft rotations controlled by a controller to move the wiper output shaft to the correct position on the windshield. In such systems, the actual position of wiper arm on the windshield is a derivative of motor shaft-controlled rotations. This is an open loop control scheme that can lead to discrepancy in sweep/park limits and sweep angle due to system inertia, aerodynamic forces, or gear train aging, for example. Certain new windshield wiper systems can achieve the oscillatory motion of the wiper arm by alternatively changing the direction of the drive-motor shaft rotations directly (e.g., counter clockwise and clockwise but without the need for employing a four-bar mechanism. In such systems however, there may be an occasional over sweeping of the wiper arm during operation. Additionally, conventional systems do not provide explicit control for avoiding an abrupt overshooting or over sweep in the event of failure of existing wiper soft controls for sweep limits, for example. Typical windshield wiper systems do not have a positive stops for avoiding the over sweep, which can cause damage to the airframe or wiper externals, in the event of failure of current soft controls. Additionally, because the position of the wiper arm on the windshield is not sensed, any over sweep or under sweep cannot be traced.

Embodiments provide a closed-loop control for the wiper arm shaft rather than motor shaft, to precisely control the wiper on windshield. As shown, embodiments can include a "miniature-wiper" (e.g., a tracer 119, 219 as discussed herein) at the rear end of the wiper output shaft (e.g., the wiper drive shaft). The main wiper arm and mini-wiper are mounted on the same shaft and are mounted in same line so that mini-wiper position transposes the angular position of the wiper arm on windshield, at the rear end of the wiper output shaft.

In certain embodiments, the mini-wiper tip can be equipped with a sensor transmitter. Sensor receivers can be placed at the two sweep limits and park position, respectively to receive sensor signals from the mini-wiper tip as the mini-wiper moves between the positions with the main wiper arm. Position feedback with respect to the mini-wiper received from the sensors can then be used to control the motor revolutions to meet the sweep/park limits of the main wiper on the windshield. This enables avoiding the under/over run of the sweep limits, as described further below.

Figure 2:
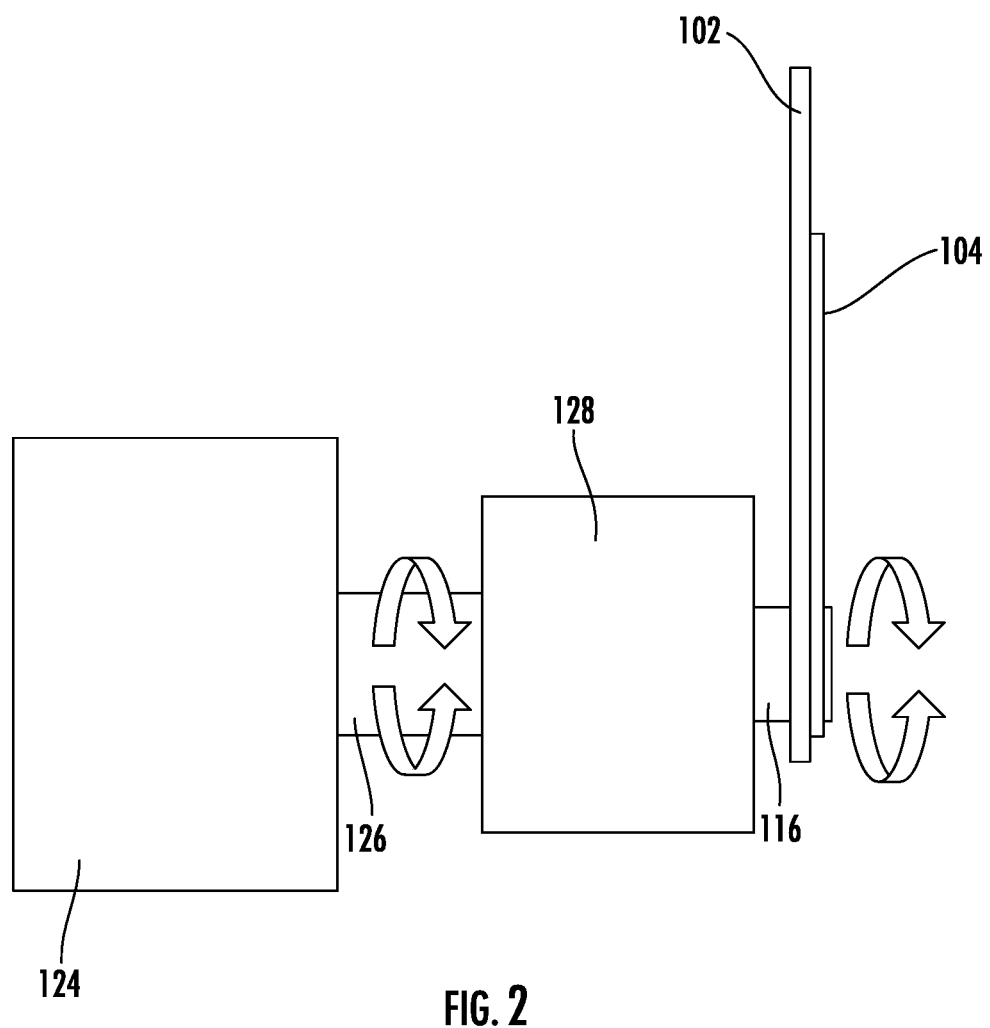
FIG. 2 is a schematic view of the system of FIG. 1; showing mechanical connection of the wiper system.
Figure 3:
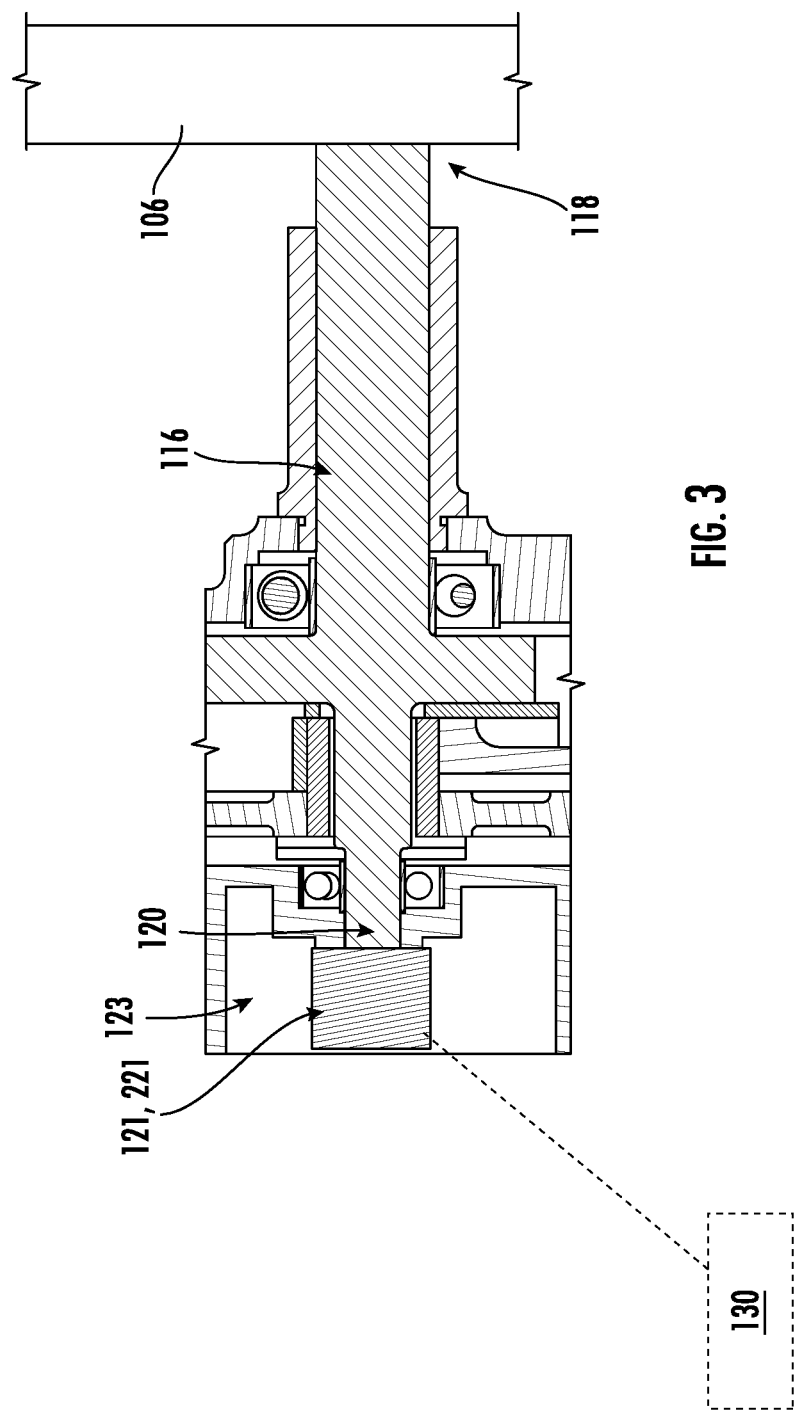
FIG. 3 is a partial cross sectional view of the mechanical connections of FIG. 2.

In embodiments, the wiper arm can be driven by wiper motor through a gear reducer such that multiple revolutions of motor shaft (N1>>N2) are needed to produce the required sweep angle (arc) of the wiper arm on the windshield, e.g., as shown in FIG. 2. The gear reducer can provide greater flexibility to control the sweep angle accuracy by applying the control on motor shaft. The number of motor shaft rotations in each direction (clockwise and counter clockwise) to achieve the sweep angle can be defined by software code with respect to the reference position (e.g., inboard position) to meet the sweep/park limits and sweep angle. The control logic can define the number of motor rotations in each direction to cover the angle as needed for a given application, for example for different vehicle, windshield, and/or wiper specifications.

For the purposes of explanation and not limitation, an example windshield wiper system is described. In this example, it is assumed that the gear ratio (N1/N2) between the wiper motor and the wiper shaft (e.g. as shown in FIG. 2) is 20, meaning for 10° rotation of the wiper arm, the motor must make 10°×20, or 200° of rotation, which correlates to about 0.6 revolutions of motor shaft (e.g., 200°/360°). This can move the wiper arm from the park position to the start position. For a 50° inboard/outboard stroke of the wiper arm, the motor makes 50°×20, or 1000° unidirectional rotation, which is about 2.8 revolutions of the motor shaft (e.g., 1000°/360°). An example of the code for the above wiping cycle could be the following:

a. On start, rotate the motor shaft by 0.6 to more from PARK to START of sweep, plus 2.8 revolutions (200+1000=1200°) clockwise to get to 'END' of sweep;

b. Rotate motor shaft by 2.8 revolutions (1000°) counter clockwise to get to 'START' of sweep;

c. Rotate motor shaft by 2.8 revolutions (1000°) CW to get to 'END' of sweep;

d. Repeat c and d, until 'STOP' is commanded;

e. On 'STOP', rotate motor shaft by 0.6+2.8 revolutions (200+1000=1200 0) CCW to get from END of sweep to PARK.

The position of sensor receivers correlate to the START, END, and PARK positions control the sweep/park limits of wiper arm in addition to the coded revolutions. However, if the coded revolutions deviate from the set limits, the sensors will automatically stop or reverse the motor shaft to change the direction of the motor once the respective sensor receiver receives the signal from the transmitter on the mini-wiper. The output of the IR receiver can be discrete and interfaced to one of the GPIO (general purpose input or output) in the control logic of wiper system (e.g., in the controller 130). Precisely placing the sensors at the desired sweep limits means that the wiper system is enabled to meet the exact preset sweep limits and provide closed loop feedback to ensure that the wiper arm sweeps the whole sweep zone, irrespective of whether the number of rotations coded for the motor shaft have occurred. For example, if the coded number of rotations of the motor shaft will cause the wiper arm to sweep beyond the START or END positions, when the mini-wiper passes over the corresponding sensor receiver, the controller will cause the motor shaft to change directions, even though the full number of motor shaft rotations was not met. The same can be said for under sweeping, where the controller can cause the motor shaft to rotate more than the coded number of rotations if the coded number of rotations will cause the wiper arm to reverse direction before it reaches the START or END positions. Here, the controller will cause the motor shaft to continue to rotate until the mini-wiper interacts with the respective sensor corresponding to the wiper arm actually reaching its scheduled position. The limits of wiper sweep on the windshield are therefore achieved by imposing the limits on mini wiper.

For example, when the wiper system is commanded on (e.g., by a Pilot/Copilot), the wiper arm and mini-wiper starts its sweep from the PARK position. The sensor transmitter on mini-wiper can be powered-ON whenever there is a command for the wiper to sweep. The sensor transmitter on the mini-wiper makes a line of contact with one sensor (e.g., sensor 132c) which is installed at "PARK" position. A discrete signal is generated at the sensor 132c and this triggers controller to begin the sweep cycle, and the controller then rotates the wiper arm towards 'START', where the mini-wiper then moves towards the sensor at the START position (e.g., sensor 132a). Then, the sensor transmitter on the mini-wiper makes a line of contact with the sensor 132a which is installed at "START" angle of the sweep. A discrete signal is generated at sensor 132a and this triggers controller to keep counting the wiper sweep angle based on the number of rotations of the motor shaft to approximate how close the wiper arm is to the "STOP" angle. When the wiper arm nears the "STOP" angle, the controller can reduce the motor speed to at the "END" limit as sensed when the mini-wiper reaches the sweep STOP angle, and the sensor transmitter makes line of contact with sensor 132b and triggers controller logic to stop the wiper shaft and then rotate the motor shaft in the opposite direction. A similar control scheme can be employed in the other direction, as the wiper oscillates during operation. When the wiper system is powered off, the mini-wiper is moved beyond the START sensor 132a, until the controller senses the signal from PARK sensor 132c to park the wiper at the given park limit. Accordingly, the sweep and park limits can be controlled using the mini-wiper positions feedback through the sensors.

A relatively large gear ratio between the motor shaft and the wiper shaft can be chosen that only a few rotations of the wiper shaft occur while the controller processes the signals to stop and rotate motor back the other direction, which limits lag impact with respect to exceeding the sweep limit. While the strokes are still controlled, at least partially, by the coded number of motor revolutions required to execute the respective inboard/outboard/park strokes, the accuracy of the sweep is achieved by providing the sensor signal at respective positions (targets). For example, if the outboard sensor signal is received before executing the number of cycles, the stroke will be reversed as it reached the respective position on windshield. Thus, it corrects the over sweep. If the outboard signal is not received despite executing the prescribed number of motor revolutions, the wiper motor will continue to run in same direction (stroke continuation) until it gets the position signal. Thus, it corrects the under sweep. FIGS. 5 and 6 show a closed loop control block diagram showing the control functionality as described above.

Embodiments provide a method for creating a mini-wiper system with sweep limits defined, at rear end of output shaft and to control the actual wiper on windshield for sweep/park limits accurately. Embodiments provide a method of imposing sweep limits based on actual position of wiper on windshield, irrespective of the motor shaft rotation angle. Embodiments provide a method of using the sensors for sensing sweep limits. Embodiments provide a method of electronically correcting the sweep control limits dynamically (e.g., intelligent control of sweep and limits).

Embodiments can provide control of wiper externals components using wiper internal components, and embodiments can implement a closed loop control for sweep angle, with a sensor circuit card assembly.

Embodiments can be contained entirely within the internal wiper system and no components are required to be on the external wiper arm or windshield to take the positional feedback of the wiper arm. Embodiments can avoid the discrepancy in sweep limits and park position and can control either wiper over-sweep or under-sweep. Embodiments can provide more consistent performance of the wiper system and can enable maintaining the sweep limits with greater accuracies. Embodiments can increase the workable life of the wiper arm by avoiding wiper crashes or damage caused by over sweep, for example, and the position sensing of the wiper arm can be unaffected by unpredicted additional loads due to damaged blade resulting from over sweep of blade on to the frame. Embodiments can therefore provide increased reliability of the motor and external wiper system components, while having low cost of implementation Embodiments, such as shown in FIGS. 7-9 for example, can include a real-time position tracker (e.g., a tracer or a cam) mounted on the distal end of the wiper shaft. The tracer can facilitate imitation of the wiper movement on the rear end of shaft. The limit switches can be placed in the rear housing for the tracer to interact with. The limit switches can be placed on either side of defined sweep angle limits, which overshooting is to be positively stopped.

In embodiments, as shown in FIG. 8, the tracer can be either mounted in-line with wiper axis (e.g., as shown), or with an offset, with respect to the axis of wiper arm, for example a translational offset in a similar axis to the central shaft rotation. In certain embodiments, the offset between the wiper and the tracer can change the switch limit position by the same angular offset with respect to the defined wiper limits. Thus, relative sweep limits can be derived for the tracer with respect to the wiper arm which can provide greater design freedom when designing the rear housing.

Because the tracer is mounted directly on the same wiper output shaft, it can imitates sweeping cycles of the wiper arm. The limit-switches can be placed outside the maximum sweep limits, e.g., spaced from the maximum sweep limits by a required margin on either side of the sweep area, beyond which wiper is not expected to move in the event of over sweep. The limit switches can be located on either side such that, when the maximum limit is crossed, the tracer comes into contact with the respective limit switch to shut off the wiper system. When the wiper arm operates within the defined sweep limits, the tracer does not touch the limit-switches, and thus, the sweeping cycles continue.

As the tracer replicates the exact relative angular movement of the wiper arm, in case of wiper arm over sweep, the tracer also moves out of the sweep zone and activates the limit-switch placed outside the maximum limit of sweep zone. Thus, the tracer shuts down the wiper system by activating the limit-switch, preventing further movement of wiper arm. Here, the sweeping cycles are stopped, because the wiper system is shut down. Accordingly, embodiments provide a positive stop to the wiper arm, e.g., in case of over sweep, without forcing blocked rotor conditions.

Embodiments allow for real-time tracing of the wiper arm position on the windshield without any mountings on windshield, e.g., by using the tracer. Embodiments can impose absolute limits on the tracer, and thus allows for more accurate control of the wiper arm when the absolute limits are reached.

Embodiments can output an error condition to a user (e.g., a pilot) for an over sweep error causing the system to shut down, which can differentiate from other errors, such as a blocked rotor error, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising,
a wiper arm configured to sweep along a sweep zone defined between a start position and an end sweep position;
a wiper drive shaft operatively connected at a proximal end to the wiper arm to drive the wiper arm between the start position and the end sweep position;
a tracer operatively connected to a distal end of the wiper drive shaft configured to mimic movement of the wiper arm;
one or more position indicators disposed proximate a distal end of the tracer corresponding to at least the start position and the end sweep position, the distal end of the tracer configured to interact with the one or more position indicators during operation of the wiper arm, wherein the tracer and the one or more position indicators are in electronic communication with one another to generate wiper arm position data used to direct movement of the wiper arm between the start position and the end sweep position; and
a controller operatively connected to the one or more position indicators to receive the wiper arm position data therefrom, the controller configured control movement of the wiper arm to prevent the wiper arm from sweeping beyond the start position and the end sweep position during operation of the wiper arm based at least in part on the wiper arm position data.

2. The system of claim 1, wherein the one or more position indicators includes one or more sensors of a sensor array.

3. The system of claim 2, wherein the distal end of the tracer includes a sensor transmitter configured to transmit a sensor signal from the tracer to the sensor array.

4. The system of claim 3, wherein the one or more sensors includes a first sensor and a second sensor, wherein the first and second sensors including sensor receivers configured to receive the sensor signal from the tracer to determine a position of the tracer along the sensor array.

5. The system of claim 4, wherein, the first sensor and the second sensor are physically positioned on the sensor array to indicate one or more desired sweep positions.

6. The system of claim 5, wherein the sensor array further includes a third sensor corresponding to a park position, wherein the third sensor includes a sensor receiver configured to receive sensor signal from the tracer to determine when the wiper arm is in the park position.

7. The system of claim 5, further comprising a motor having a motor drive shaft operatively connected to the wiper drive shaft to oscillate the wiper arm via the wiper drive shaft.

8. The system of claim 7, wherein with the tracer proximate the first sensor or the second sensor such that the first sensor or the second sensor receives a respective sensor signal from the sensor transmitter on the tracer, the controller is configured to stop and/or reverse movement of the wiper arm irrespective of whether a predetermined number of motor shaft revolutions have occurred.

9. The system of claim 1, further comprising a vehicle having a windshield, the wiper arm mounted to the vehicle configured to wipe the windshield, wherein an area between the start position and the end sweep position defines a sweep zone.

10. The system of claim 9, wherein the vehicle is an aircraft and the windshield is a cockpit windshield.

11. A system, comprising,
a wiper arm configured to sweep along a sweep zone defined between a start position and an end sweep position;
a wiper drive shaft operatively connected at a proximal end to the wiper arm to drive the wiper arm between the start position and the end sweep position;
a tracer operatively connected to a distal end of the wiper drive shaft configured to mimic movement of the wiper arm;
one or more position limiters disposed proximate a distal end of the tracer corresponding to at least the start position and the end sweep position, the distal end of the tracer configured to interact with the one or more position indicators during operation of the wiper arm, wherein the tracer and the one or more position indicators limiters are in electronic communication with one another to generate wiper arm position data used to direct movement of the wiper arm between the start position and the end sweep position; and
a controller operatively connected to the one or more position limiters to receive the wiper arm position data therefrom, the controller configured control movement of the wiper arm to prevent the wiper arm from sweeping beyond the start position and the end sweep position during operation of the wiper arm based at least in part on the wiper arm position data.

12. The system of claim 11, wherein the one or more position limiters includes a first limit switch and a second limit switch corresponding to position limits just beyond the start position and the end sweep position.

13. The system of claim 12, further comprising a motor having a motor drive shaft operatively connected to the wiper drive shaft to drive the wiper arm via the wiper drive shaft.

14. The system of claim 13, wherein with the tracer activating the first limit switch or the second limit switch, the controller is configured to stop movement of the wiper arm and shut down the motor irrespective of whether a predetermined number of motor shaft revolutions have occurred.

15. The system of claim 11, further comprising a vehicle having a windshield, the wiper arm mounted to the vehicle configured to wipe the windshield, wherein an area between the start position and the end sweep position defines a sweep zone, wherein the sweep zone is defined on the windshield based on a desired user viewing portion.

16. The system of claim 15, wherein the vehicle is an aircraft and the windshield is a cockpit windshield.

17. A non-transitory computer readable medium having computer executable instructions stored therein, the computer executable instructions configured to cause a computer to perform a method, the method comprising:
   receiving wiper arm position data from one or more position indicators in communication with a tracer, wherein the tracer and the one or more position indicators are in electronic communication with one another to generate wiper arm position data used to direct movement of the wiper arm between a start position and an end sweep position; and
   controlling movement of a wiper arm based at least in part on a position of the tracer operatively connected to the wiper arm relative to the one or more position indicators such that total displacement of the wiper arm is confined to a predetermined sweep zone defined by the one or more position limiters.

18. The medium of claim 17, wherein controlling movement of the wiper arm includes: stopping movement of the wiper arm and/or reversing movement of the wiper arm when
   the tracer interacts with the one or more position indicators irrespective of whether a predetermined number of wiper shaft revolutions have occurred.

19. The medium of claim 18, wherein one or more position indicators includes a first sensor and a second sensor defining the sweep zone, the first and second sensors including sensor receivers configured to receive a sensor signal from a sensor transmitter on the tracer to determine a position of the tracer along the sensor array, wherein controlling movement of the wiper arm includes:
   reversing movement of the wiper arm when the tracer is proximate the first sensor or the second sensor irrespective of whether a predetermined number of wiper shaft revolutions have occurred.

20. The medium of claim 18, wherein the one or more position indicators includes a first limit switch and a second limit switch positioned just beyond an inner and an outer limit of the sweep zone, wherein controlling movement of the wiper arm includes:
   stopping movement of the wiper arm and/or shutting down a wiper system when the tracer activates the first limit switch or the second limit switch, irrespective of whether a predetermined number of wiper shaft revolutions have occurred.

* * * * *